United States Patent
Arbel et al.

(10) Patent No.: US 7,676,778 B2
(45) Date of Patent: Mar. 9, 2010

(54) CIRCUIT DESIGN OPTIMIZATION OF INTEGRATED CIRCUIT BASED CLOCK GATED MEMORY ELEMENTS

(75) Inventors: Eli Arbel, Migdal Haemek (IL); Cynthia Rae Eisner, Zichron Yaacov (IL); Alexander Itskovich, Yoqneam Ilit (IL); Nicolas Maeding, Holzgerlingen (DE)

(73) Assignee: International Business Machines Corporation, Armonk, NY (US)

( * ) Notice: Subject to any disclaimer, the term of this patent is extended or adjusted under 35 U.S.C. 154(b) by 237 days.

(21) Appl. No.: 11/773,412

(22) Filed: Jul. 4, 2007

(65) Prior Publication Data

US 2009/0013289 A1 Jan. 8, 2009

(51) Int. Cl.
*G06F 17/50* (2006.01)
(52) U.S. Cl. .............................. 716/6; 716/2
(58) Field of Classification Search ........ None
See application file for complete search history.

(56) References Cited

U.S. PATENT DOCUMENTS

| | | | |
|---|---|---|---|
| 5,801,955 A * | 9/1998 | Burgun et al. ............... 716/6 |
| 5,831,866 A * | 11/1998 | Burgun et al. ............... 716/6 |
| 5,980,092 A * | 11/1999 | Merryman et al. ........... 716/6 |
| 6,247,134 B1 | 6/2001 | Sproch et al. |
| 6,301,553 B1 * | 10/2001 | Burgun et al. ............... 703/15 |
| 6,704,878 B1 | 3/2004 | Benini et al. |
| 7,068,080 B1 | 6/2006 | Sanders |
| 2004/0230923 A1 | 11/2004 | Wilcox et al. |

* cited by examiner

*Primary Examiner*—Leigh Marie Garbowski

(57) ABSTRACT

A novel method for optimizing the design of digital circuits containing clock gated memory elements. The method unclock gates memory elements by adding necessary feedback loops. Logic functions of memory element outputs in the circuit are viewed as a whole, rather than as separate functions for each input. Detection of duplicate unclock gated memory elements is then effected by identifying identical canonical representations of said unclock gated memory elements. Identified duplicate clock gated memory elements can then be eliminated from the original digital circuit. Further optimization can be accomplished by applying standard logic optimization algorithms to all unclock gated memory elements in said digital circuit. The resulting optimized circuit is clock gated and replaces the original clock gated circuit in said digital circuit.

20 Claims, 8 Drawing Sheets

CIRCUIT DESIGN OPTIMIZATION OF INTEGRATED CIRCUIT BASED CLOCK GATED MEMORY ELEMENTS

FIELD OF THE INVENTION

The present invention relates to the field of integrated circuit design tools and more particularly relates to a method of optimizing logic design by eliminating duplicate memory elements and simplifying logic circuits for integrated circuit designs where memory elements are toggled by an enable pin or a clock gate.

BACKGROUND OF THE INVENTION

Logic synthesis is well known in the integrated circuit design arts. Logic synthesis is the process of transforming a register-transfer level (RTL) description of a circuit into an implementation consisting of a set of interconnected gates. During this process logically equivalent memory elements can be implemented using different design elements in order to meet necessary constraints.

An example prior art original circuit design is shown in FIG. 1A. The circuit, generally referenced 10, comprises AND gate 12 and a memory element 14 which may comprise a latch, register, flip-flop, etc. The circuit directly implements Verilog code "always @(posedge clk) Q <=A & B;" which implements the logic function

Q=A & B

A second example prior art original circuit design is shown in FIG. 1B. The circuit, generally referenced 20, comprises NOT gates 22 and 24, OR gate 26 and memory element 28.

The circuit implements Verilog code "always @(posedge clk) Q<=!(A|B);" which implements the logic function

Q=!(!A|!B)

which is functionally equivalent to

Q=A & B

Due to the increased density of modern integrated circuits (ICs), the amount of power consumed by modern ICs continues to escalate. In response, there has been an increasing focus to lower the power consumption of new digital hardware circuits. One approach to reducing power consumption is to employ so called clock gating, a technique which manufacturers have incorporated into the automated design of digital hardware circuits.

Clock gating is a well known technique used to reduce the power consumption of digital hardware circuits. It is often employed as one of several power saving techniques typically applied to synchronous circuits used in large microprocessors and other complex circuits. To save power, clock gating solutions add additional logic to a circuit to modify the functionality of the clock input of a flip-flop or latch, thereby disabling portions of the circuitry where flip-flops or latches do not change state.

An example prior art original circuit design without any clock gating applied is shown in FIG. 2A. The circuit, generally referenced 30, comprises logic cloud 32, multiplexer 34 and memory element 36. In the circuit, the CLK signal is input directly into memory element 36, and the inputs to the multiplexer comprise the output Q1 from the memory element, signal I from logic cloud 36 and the EN signal. This circuit implements the logic function If (EN) then I else (Keep Old Value)

An example prior art circuit design of a clock gated circuit of FIG. 2A is shown in FIG. 2B. The circuit, generally referenced 40, comprises logic cloud 42, AND gate 44 and memory element 46. In this circuit, the EN and CLK signals are input to AND gate 44, whose output is the input of memory element 46. This circuit also implements the logic function If (EN) then I else (Keep Old Value)

When analyzing the circuits shown in FIGS. 2A and 2B, viewing the data and the clock inputs separately (as is done in logic synthesis today), memory elements 36 and 46 appear to have different functionality, because the data input of 36 has different functionality that the data input of 46, and the clock inputs differ as well. By considering the entire logic circuits as a whole, it is evident that both implement the aforementioned identical logic function. Considering entire logic circuits as a whole enables many logic transformations and optimizations that are not possible otherwise.

Current synthesis tools generally do not allow changing the number of memory elements used to implement a design. Therefore, the synthesis tool does not attempt to locate identical memory elements (latches or flip-flops) in order to remove duplicates. With the recent widespread acceptance of clock gating as a viable design technique, synthesis tools are freer to add or remove flip-flops or latches. Since synthesis tools are now freer, it is logical that they search for redundant memory elements, that is, two or more memory elements that have the exact same function. When clock gating is not implemented, synthesis tools can locate redundant memory elements by comparing the function of the input pins. Under clock gating, however, it does not suffice to compare the inputs. Under clock gating, the data and clock inputs may be different, but the functionality of the memory elements can still be identical, depending on the clock gating function.

SUMMARY OF THE INVENTION

The present invention provides a solution to the prior art problems discussed supra by identifying clock gated circuits that are functionally equivalent to other clock gated circuits, even though their data inputs differ. The clock gated circuits are first unclock gated in order that the inputs and output(s) can be compared by generating a canonical representation of the unclock gated circuit. Any duplicate circuits identified can then be eliminated from the digital design. In addition, the invention also provides a method to detect and implement logic simplification on clock gated circuits by first unclock gating the circuit.

The invention enables the development of synthesis tools which generate more efficient digital designs containing clock gated circuits. Both the elimination of duplicate clock gated circuits, and the logical simplification of clock gated circuits results in more energy efficient digital designs.

The invention analyzes all of the inputs and outputs of a clock gated circuit. Since functionally equivalent clock gated circuits may have different data inputs, the clock gated circuits first need to be unclock gated. Removing functionally equivalent unclock gated circuits involves generating a canonical representation of the inputs and output(s) of the unclock gated circuit. A canonical representation enables an object to be uniquely identified by indicating a particular choice from a number of possible conventions. In this case, the canonical representation indicates a possible combination of the unclock gated circuits inputs and outputs.

When complete, the canonical representation can be compared against the canonical representations of other circuits in the design, with the goal being to locate identical canonical representations which imply duplicate circuits. Duplicate circuits from the design can then be eliminated.

By treating the clock and data separately, unclock gating a circuit also enables the use of standard logic optimization techniques in order to reduce combinational logic while retaining the same logical function. The resulting clock gated circuit is then clock gated and inserted into the original digital design.

The mechanism of the invention is capable of operating at a relatively early stage in the design cycle. The mechanism operates on clock gating solutions that are generated at a stage in the design wherein the exact logic design is not finalized. The functionality is known but the circuit has not yet been optimized, thus exact timing information or power usage is not available. Alternatively, the mechanism of the invention could be used at a late stage of the design cycle.

An advantage of the circuit design optimization technique of the invention is the ability to optimize clock gated circuits that were previously unable to be optimized using standard techniques. Digital designs using these optimization techniques have fewer memory elements, and can result in potential savings in both fabrication costs and in reduced energy usage.

Note that some aspects of the invention described herein may be constructed as software objects that are executed in embedded devices as firmware, software objects that are executed as part of a software application on either an embedded or non-embedded computer system such as a digital signal processor (DSP), microcomputer, minicomputer, microprocessor, etc. running a real-time operating system such as WinCE, Symbian, OSE, Embedded LINUX, etc. or non-real time operating system such as Windows, UNIX, LINUX, etc., or as soft core realized HDL circuits embodied in an Application Specific Integrated Circuit (ASIC) or Field Programmable Gate Array (FPGA), or as functionally equivalent discrete hardware components.

Therefore, there is a need for a hardware development tool mechanism that is able to optimize the implementation of clock gated circuits in a digital design. The tool should consider the entire function generating output from a memory element as a whole, rather than consisting of a function of a plurality of separate data and control inputs. Considering the function as a whole enables the tool to then locate duplicate instances of logically equivalent clock gated memory elements and provide a means to both eliminate the duplicate clock gated circuits and affect a redesign of the digital design to reflect said eliminations. In addition it should enable the identification of logic simplification opportunities for clock gated memory elements in a digital design.

There is thus provided in accordance with the invention, a method of eliminating redundant logic elements in an integrated circuit, the method comprising the steps of unclock gating each original clock gated circuit to yield an unclock gated circuit representation of each original clock gated circuit thereby, generating a canonical representation for the inputs of each unclock gated circuit representation, searching for duplicate canonical representations among the unclock gated circuit representations and removing any found duplicate circuits.

There is also provided in accordance with the invention, a method of logic simplification of a clock gated circuit having a plurality of memory elements, the method comprising the steps of unclock gating the original clock gated circuit to yield an unclock gated circuit representation of the original clock gated circuit thereby and applying logic optimization to the unclock gated circuit representation to yield a functionally identical circuit wherein the combinational logic has been optimized.

There is further provided in accordance with the invention, a method for optimizing the design of an integrated circuit having at least one clock gated circuit, the method comprising the steps of unclock gating each original clock gated circuit to yield an unclock gated circuit representation of the original clock gated circuit thereby, generating a canonical representation for the inputs of each unclock gated circuit representation, searching for duplicate canonical representations among the unclock gated circuit representations, removing any found duplicate circuits and applying logic optimization to the unclock gated circuit representation to yield a functionally identical circuit wherein the combinational logic has been optimized.

There is also provided in accordance with the invention, a method for optimizing the design of an integrated circuit having memory elements wherein a plurality of signals share co-dependency, the method comprising the steps of removing the co-dependency between the plurality of signals, performing logic optimization whereby the logic of the integrated circuit is simplified while retaining the same functionality and performing logic optimization whereby any duplicate memory elements are eliminated.

BRIEF DESCRIPTION OF THE DRAWINGS

The invention is herein described, by way of example only, with reference to the accompanying drawings, wherein.

DETAILED DESCRIPTION OF THE INVENTION

Figure 1A:
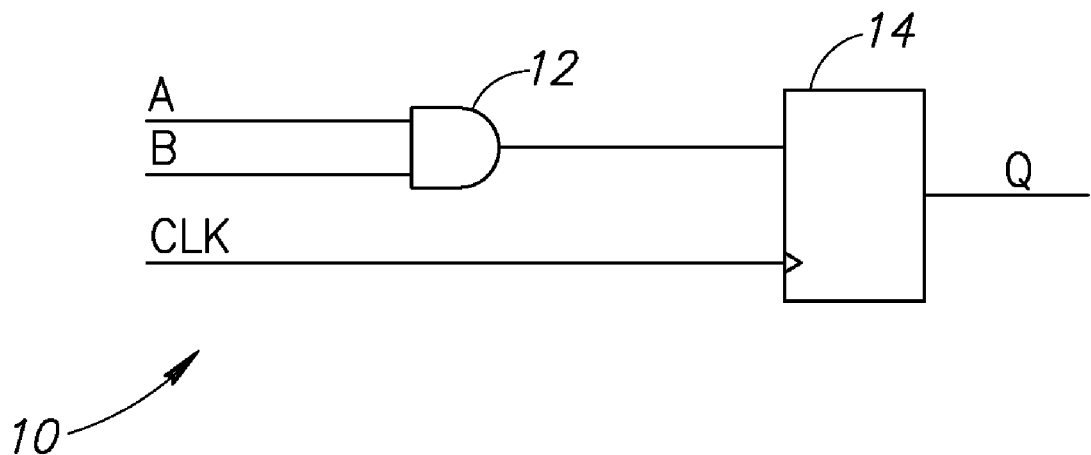
FIG. 1A is a circuit diagram illustrating an example prior art original circuit design.
Figure 1B:
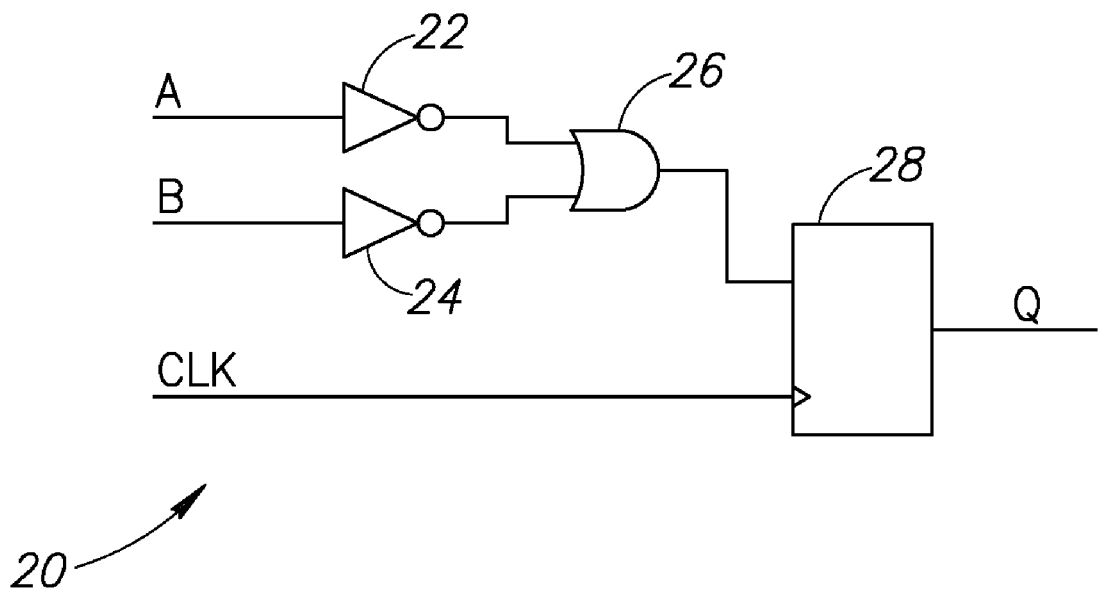
FIG. 1B is a circuit diagram illustrating a logically equivalent version of the circuit of FIG. 1A.
Figure 2A:
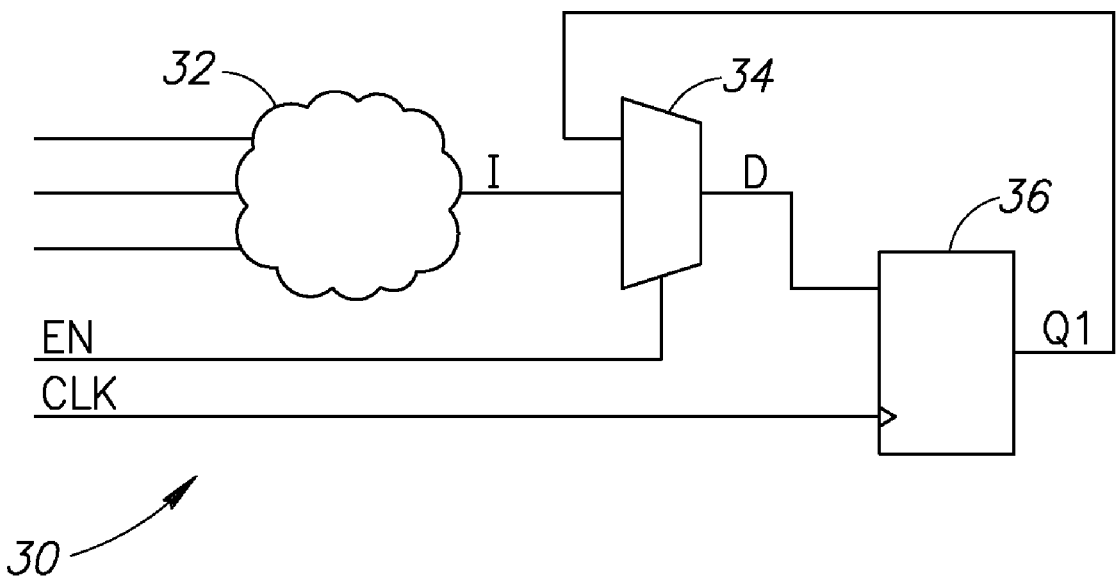
FIG. 2A is a circuit diagram illustrating an example prior art of a circuit design without any clock gating applied.
Figure 2B:
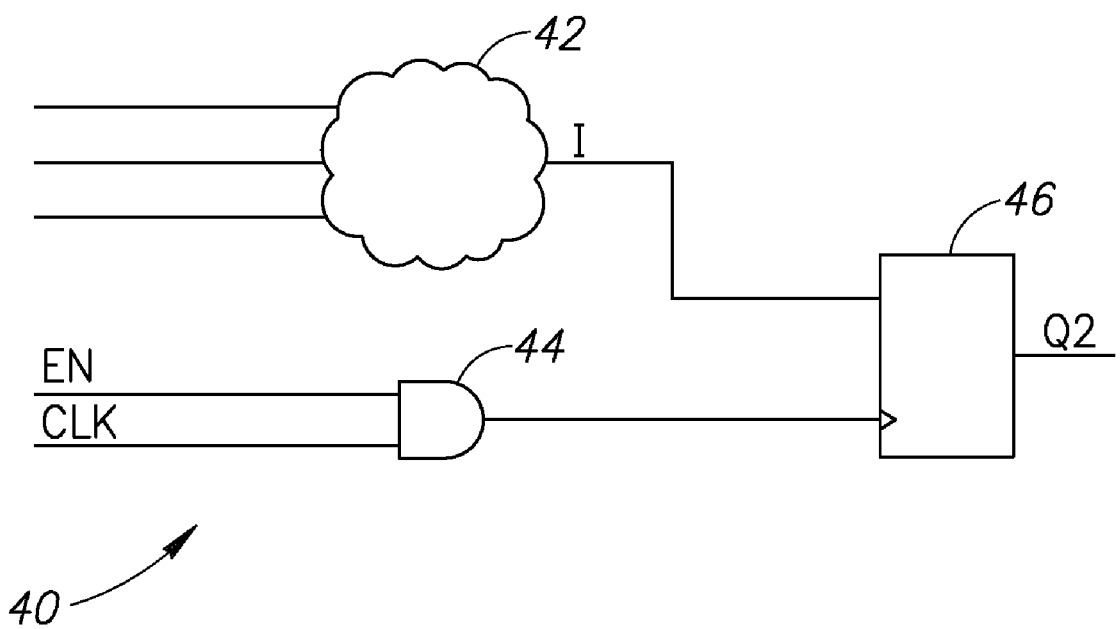
FIG. 2B is a circuit diagram illustrating a logically equivalent clock gated version of the circuit of FIG. 2A.

The present invention is a method to optimize the design of integrated circuits containing clock gated circuits by identifying functionally equivalent clock gated circuits in canonical representations thereof and simplifying the logic in the clock gated circuits. Identification of functionally equivalent clock gated circuits enables the deletion of duplicate memory elements from the design, while logic simplification redesigns the circuit with the goal of reducing combinational logic while retaining the same logical function.

The invention enables synthesis tools to be developed which generate more efficient digital designs containing clock gated circuits. Both the elimination of duplicate memory elements and the logical simplification of combinational logic result in more energy efficient digital designs.

Canonical representations allow mathematical objects to be uniquely identified by indicating a particular representation from a variety of representations. For example, the mathematical expressions (55+13) and (4×17) are equal to one another. The calculated value of 68 is a canonical representation of both equations. To store non-canonical representations, a computer must perform many calculations to determine equivalency. If the computer stores the canonical representations, then all the calculations are performed when the original canonical representations are generated, and determining equivalency can be performed by a simple comparison, involving no calculations.

Note that multiple ways may exist to generate canonical representations. For example, one canonical representation for a mathematical expression with an integer value is its numerical value, as in the previous example of 68. Another canonical representation of an integer might be its prime factorization. Thus, for the two previously noted mathematical expressions (55+13) and (4×17), we could use (2×2×17) as a canonical representation instead of 68. In digital design, a canonical representation is typically represented as a Binary Data Diagram (BDD), which shows the possible inputs and outputs of a circuit.

Note that the term memory elements is intended to refer to any circuit that is capable of retaining information, for example, latches, registers and flip-flops.

Some portions of the detailed descriptions which follow are presented in terms of procedures, logic blocks, processing, steps, and other symbolic representations of operations on data bits within a computer memory. These descriptions and representations are the means used by those skilled in the data processing arts to most effectively convey the substance of their work to others skilled in the art. A procedure, logic block, process, etc., is generally conceived to be a self-consistent sequence of steps or instructions leading to a desired result. The steps require physical manipulations of physical quantities. Usually, though not necessarily, these quantities take the form of electrical or magnetic signals capable of being stored, transferred, combined, compared and otherwise manipulated in a computer system. It has proven convenient at times, principally for reasons of common usage, to refer to these signals as bits, bytes, words, values, elements, symbols, characters, terms, numbers, or the like.

It should be born in mind that all of the above and similar terms are to be associated with the appropriate physical quantities they represent and are merely convenient labels applied to these quantities. Unless specifically stated otherwise as apparent from the following discussions, it is appreciated that throughout the present invention, discussions utilizing terms such as 'processing,' 'computing,' 'calculating,' 'determining,' 'displaying' or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The invention can take the form of an entirely hardware embodiment, an entirely software/firmware embodiment or an embodiment containing both hardware and software/firmware elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

In accordance with the invention, all clock gated circuits in the design are unclock gated by adding feedback loops. The benefit of unclock gating is that it enables the clock and data inputs to be analyzed separately. Unclock gating also enables the comparison of clock gated circuits with different clock inputs.

Figure 3:
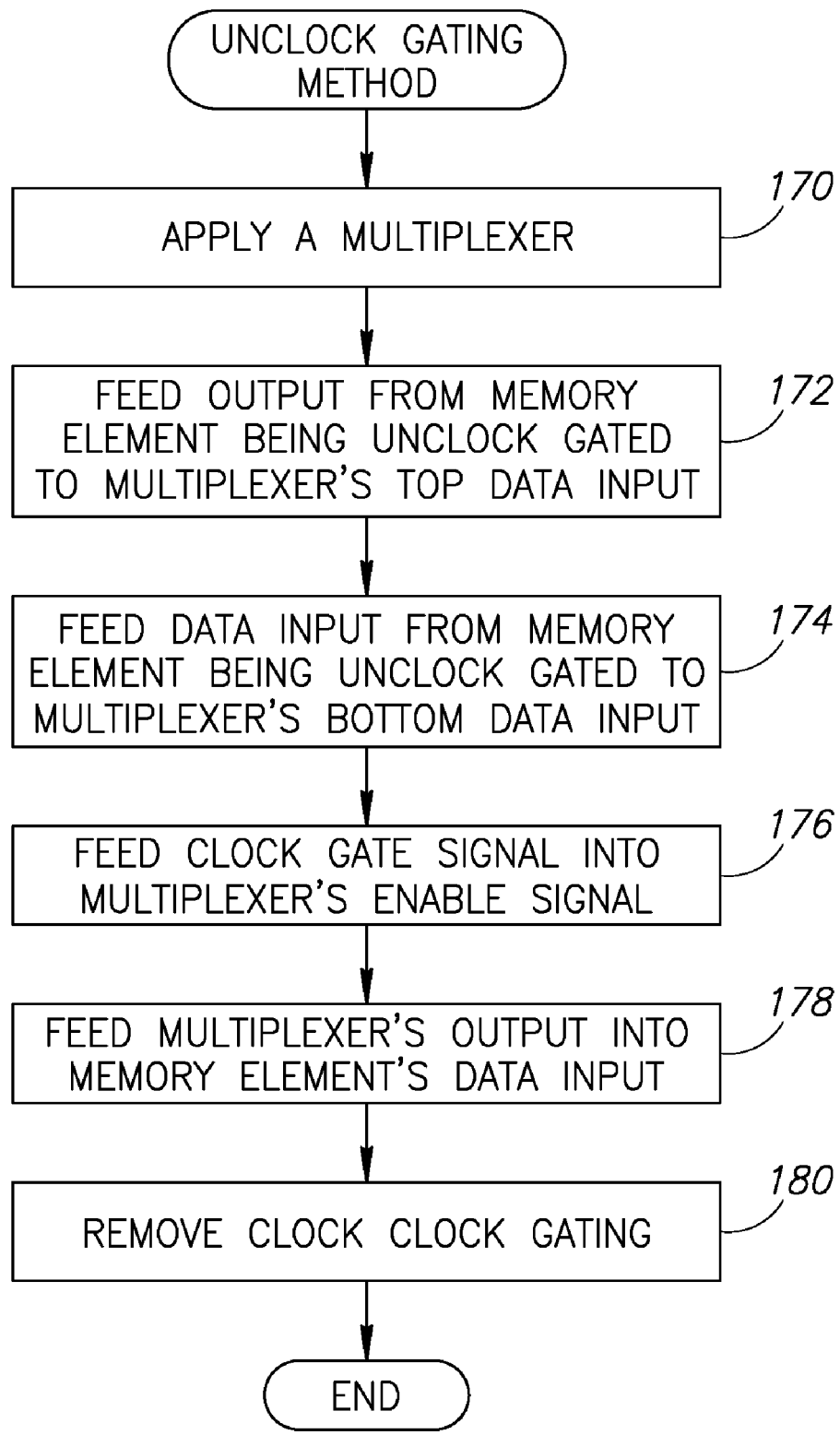
FIG. 3 is a flow diagram illustrating the unclock gating method used in the present invention.

Unclock gating is implemented by adding the necessary feedback loops to the clock gated circuit. A flow diagram illustrating the unclock gating method is shown in FIG. 3. In the example embodiment of the invention presented herein, the clock gated circuit is unclock gated by first adding a multiplexer to the circuit (step 170). The output of the memory element being unclock gated is then input into a first data input of the multiplexer (step 172). The data input of the memory element being unclock gated is then input to the second data input of the multiplexer (step 174). Next, the clock gate signal is input to the enable input of the multiplexer (step 176). The output of the multiplexer is then coupled to the data input of the memory element to be unclock gated (step 178). Finally, the clock gating logic circuitry from the original circuit is removed (step 180). It is important to note that while unclock gating adds a feedback loop if one was absent previously, it is also possible to un-clock gate a circuit which already contains a feedback loop by performing the steps indicated in the flow diagram shown in FIG. 3. In such a case, the resulting unclock gated circuit contains at least two feedback loops.

After unclock gating the plurality of clock gated circuits, canonical representations are generated for each unclock gated circuit. After the canonical representations are generated, any identical canonical representations imply clock gated circuits which are functionally equivalent. Duplicate clock gated circuits can then be eliminated from the design, and the design is reconfigured to use the remaining unique clock gated circuit.

A benefit of unclock gating the circuits in a design is that the use of standard circuit design optimization techniques is enabled where the clock and data inputs are treated separately. The optimization techniques generate functionally equivalent circuit designs that contain fewer logic elements.

Eliminating Redundant Logic Elements

In operation, the invention analyzes all the inputs and outputs of a clock gated circuit. Since functionally equivalent clock gated circuits may have different data inputs, the clock gated circuits first need to be unclock gated. Removing functionally equivalent unclock gated circuits involves generating a canonical representation of the unclock gated circuit's inputs and outputs. A canonical representation enables an object to be uniquely identified by indicating a particular choice from a number of possible conventions. In this case, the canonical representation indicates possible combination of the unclock gated circuits inputs and outputs.

When complete, the canonical representation can be compared against the canonical representations of other circuits in the design, with the goal being to locate identical canonical representations which imply duplicate circuits. Duplicate circuits from the design can then be eliminated.

Figure 4:
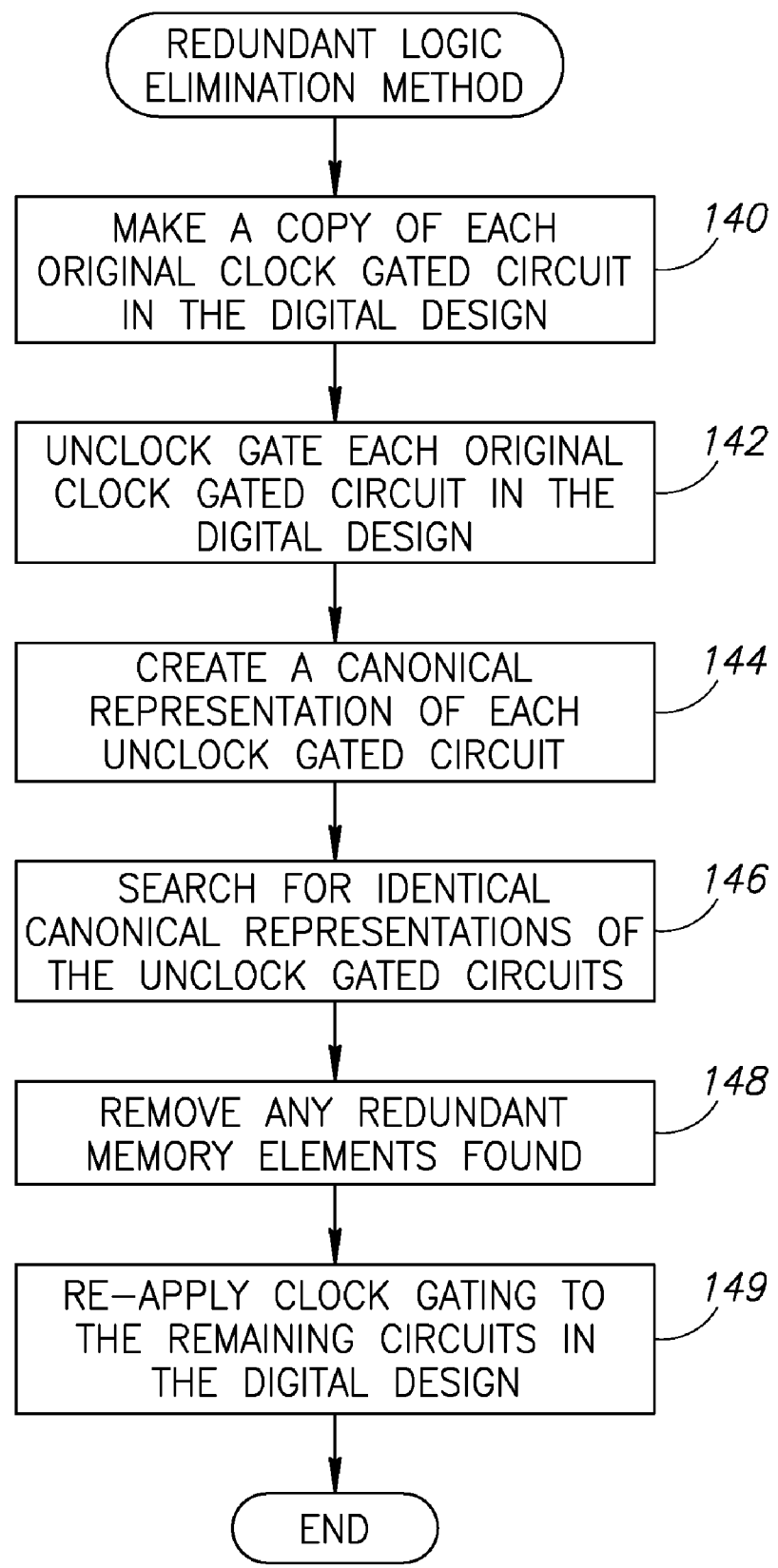
FIG. 4 is a flow diagram illustrating the redundant logic elimination method of the present invention.

A flow diagram illustrating the redundant logic elimination method can be found in FIG. 4. In an example embodiment of the invention, a circuit designer loads a digital design containing a plurality of clock gated circuits to a logic design system. The system first makes a copy of each clock gated circuit in the digital design (step 140). Using the steps previously described in FIG. 3, each clock gated circuit is then unclock gated (step 142), and canonical representations of each unclock gated circuit are then generated (step 144). The system then searches the canonical representations to locate any duplicate canonical representations. (step 146). In the event any redundant canonical representations are found elsewhere in the design, the redundant memory elements are eliminated (step 148). Clock gating can then be re-applied to the remaining circuits if desired (step 149).

Figure 5A:
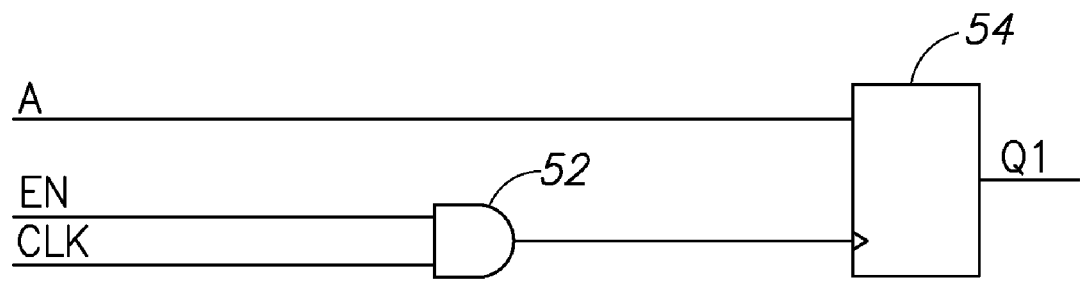
FIG. 5A is a circuit diagram illustrating a first example of a clock gated circuit, which is to be checked against other circuits for duplicates.
Figure 5B:
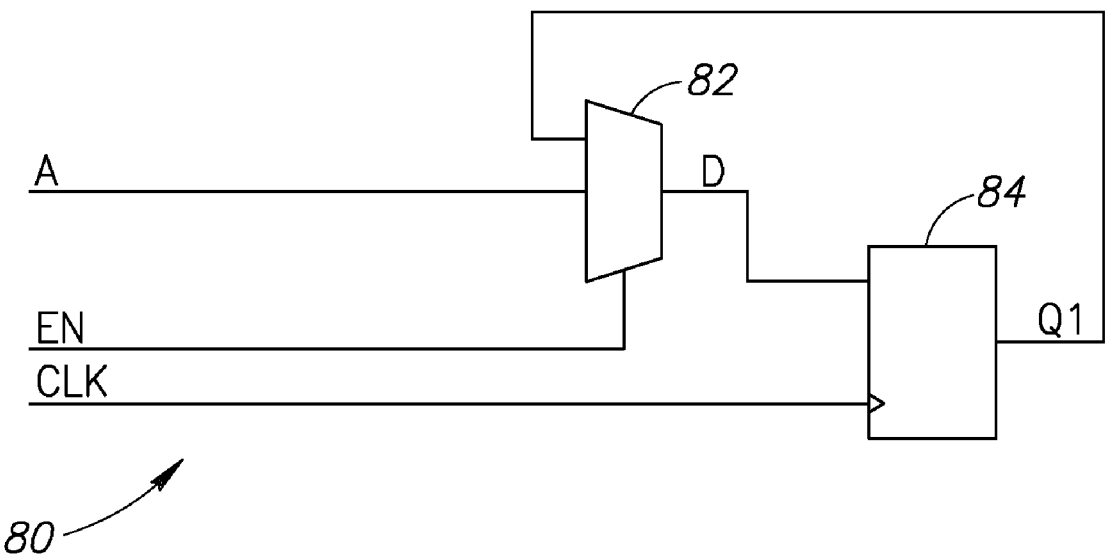
FIG. 5B is a circuit diagram illustrating an example of an unclock gated version of the circuit of FIG. 5A, which is used to generate a canonical representation of the circuit.
Figure 6A:
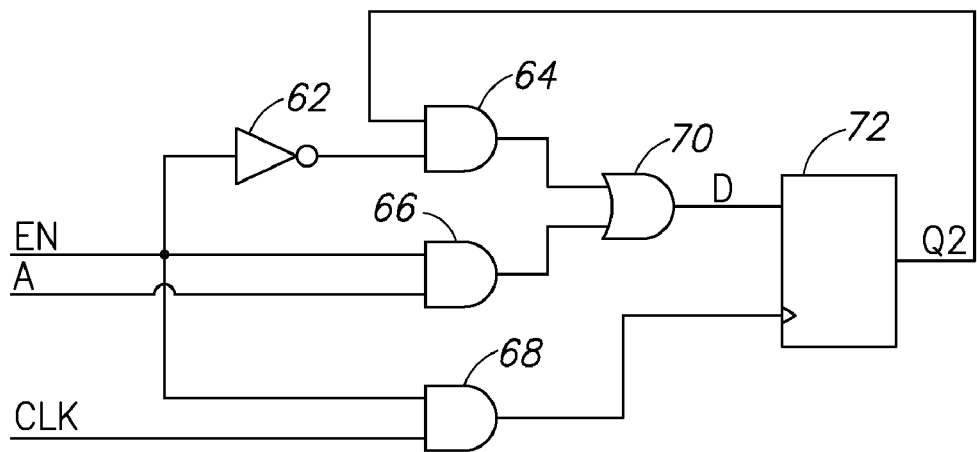
FIG. 6A is a circuit diagram illustrating a second example of a clock gated circuit, which is to be checked against other circuits for duplicates.

Two illustrative examples of using canonical representations to eliminate redundant logic elements from a design containing a plurality of clock gated circuits are shown in FIGS. 5A, 5B, 6A and 6B. FIGS. 5A and 6A contain clock gated circuits, whose unclocked versions (FIGS. 5B and 6B, respectively) are compared by canonical representation to determine if the clock gated circuits are logically equivalent.

A first example of a clock gated circuit is shown in FIG. 5A. The circuit, generally referenced 50 comprises AND gate 52 and memory element 54. The EN and CLK signals are input to AND gate 52, whose output is an input to memory element 54. An example of an unclock gated version of the circuit of 5A is shown in FIG. 5B. The circuit, generally referenced 80, comprises multiplexer 82 and memory element 84. As part of the unclock gating process, the CLK signal is input directly to memory element 84, and Q1 from memory element 84 is an input for multiplexer 82. The EN signal is another input to the multiplexer, as is signal A, the data input to original, gated version of the circuit.

To create a canonical representation of this circuit, first change the name of output Q1 to Q and then create a canonical representation of its data inputs. The resulting canonical representation of the function is equivalent to if EN then A else Q A second example of a clock gated circuit is shown in FIG. 6A. The circuit, generally referenced 60 comprises NOT gate 62, AND gates 64, 66, 68, OR gate 70 and memory element 72. This circuit has EN and CLK signals input to AND gate 68, whose output is an input to memory element 72. This circuit already contains a feedback loop, as Q2, the output from memory element 72, is an input to AND gate 64.

Figure 6B:
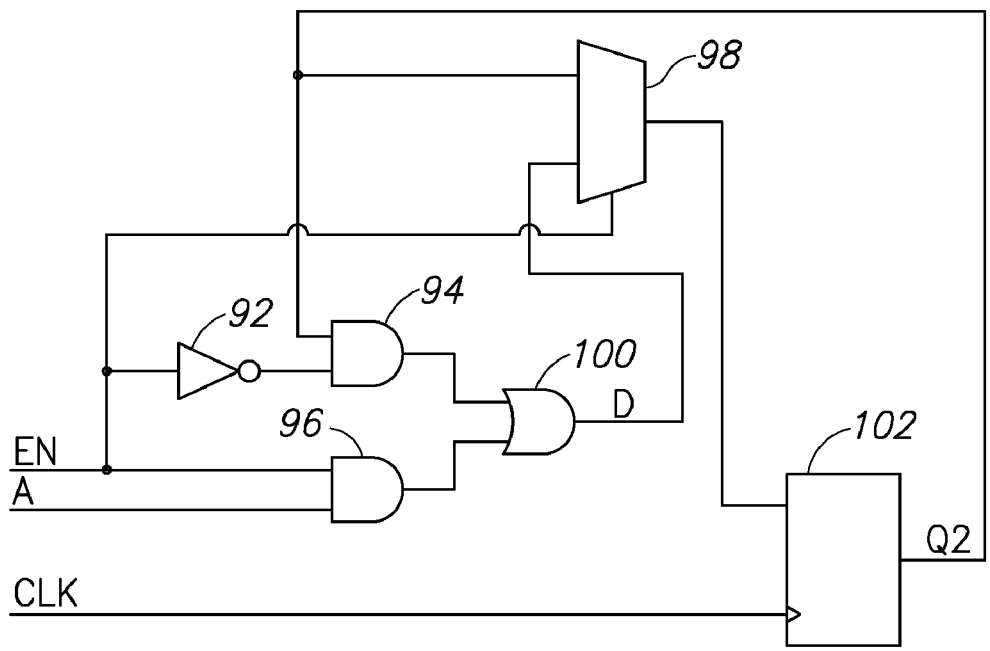
FIG. 6B is a circuit diagram illustrating an example of an unclock gated version of the circuit of FIG. 6A, which is used to generate a canonical representation of the circuit.

An example of an unclock gated version of the circuit of FIG. 6A is shown in FIG. 6B. The circuit, generally referenced 90, comprises NOT gate 92, AND gates 94, 96, multiplexer 98, OR gate 100 and memory element 102. As part of the unclock gating process, the CLK signal is input directly to memory element 102, and a second feedback loop is generated from Q2, the output of the memory element. Q2 is an input for both AND gate 94 and multiplexer 98.

To create a canonical representation of this circuit, first change the name of output Q2 to Q and then create a canonical representation of its data inputs. The resulting canonical representation of the function is equivalent to if EN then A else Q Since the circuits referenced in FIGS. 5B and 6B have identical canonical representations, it follows that the original clock gated versions of these circuits, found in FIGS. 5A and 6A are functionally equivalent. One of the circuits can then be deleted from the original design, with the necessary changes made to the design to use the retained circuit.

Logic Simplification of Clock Gated Circuits

In operation, the invention analyzes of all the inputs and outputs of a clock gated circuit, and treats the logic functions of each output of each memory element as a whole, rather than as a set of functions, where each input is associated with a separate function. By treating the clock and data together, unclock gating a circuit enables the use of standard logic optimization techniques to be effected, with the goal of reducing the number of memory elements contained in the unclock gated circuit. The resulting clock gated circuit can then clock gated and inserted into the original digital design.

Figure 7:
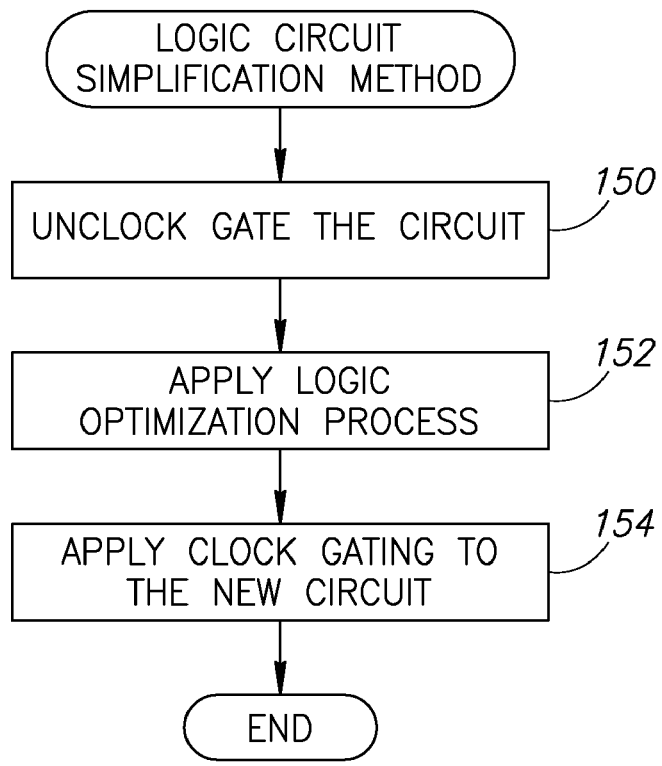
FIG. 7 is a flow diagram illustrating the logic circuit simplification method of the present invention.

A flow diagram illustrating the logic circuit simplification method of the present invention is shown in FIG. 7. In order to analyze the function of the circuit as a whole, the clock gated circuit needs first to be unclock gated, which enables the data and clock to be treated separately. In the example embodiment of the invention presented herein, an original clock gated circuit is first unclock gated using the steps noted in FIG. 3 (step 150). Then, the resulting logic of the unclock gated circuit is optimized using any well-known logic optimization technique, such as two-level or multi-level Boolean network optimization (step 152). Clock gating can then be re-applied to the circuit if desired (step 154).

Figure 8:
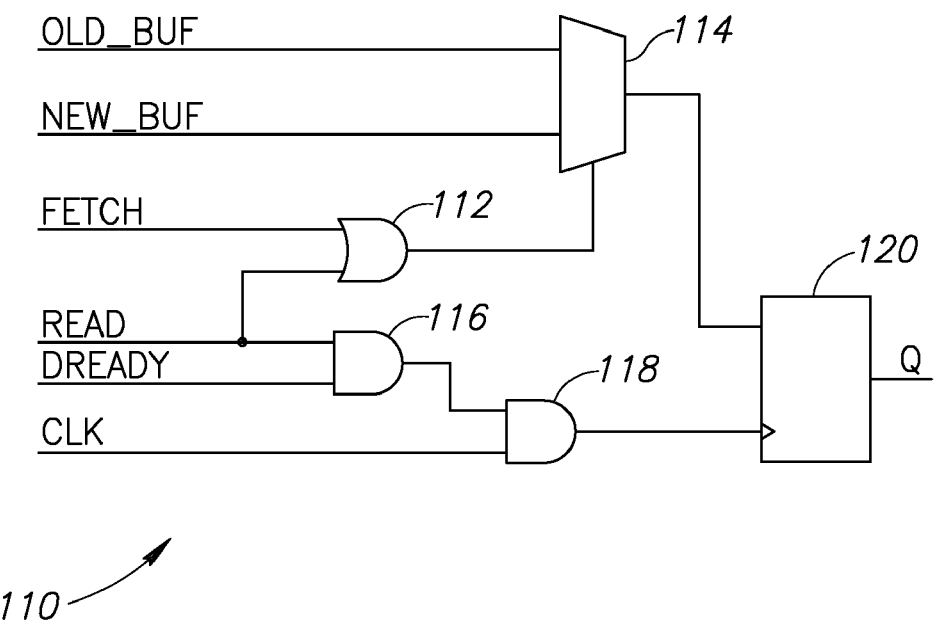
FIG. 8 is a circuit design illustrating an example of a clock gated original circuit design whose logic can be simplified.
Figure 9:
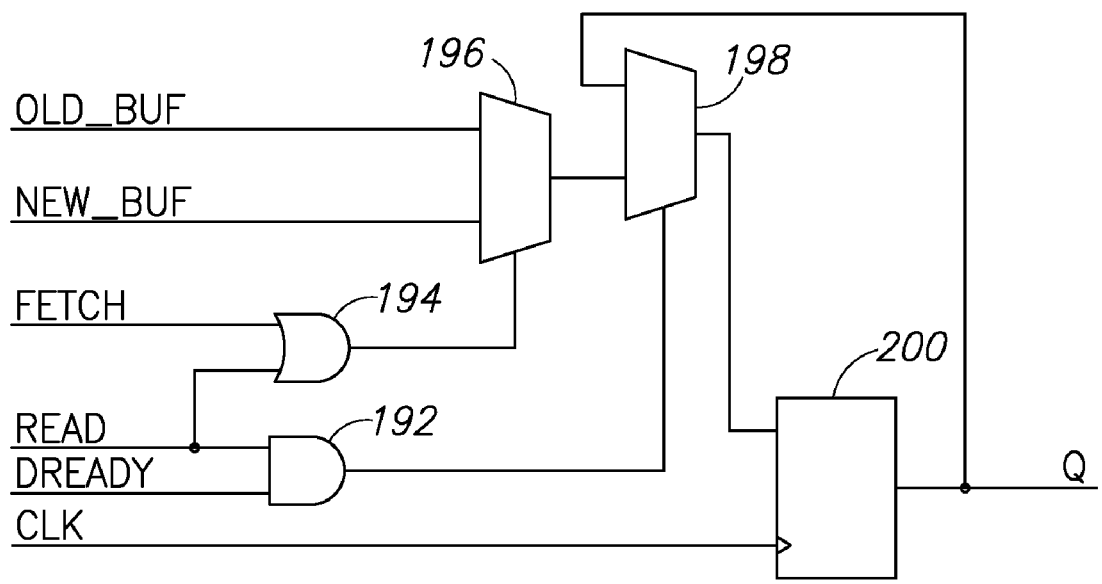
FIG. 9 is a circuit design illustrating an example of an unclock gated version of the circuit of FIG. 8.
Figure 10:
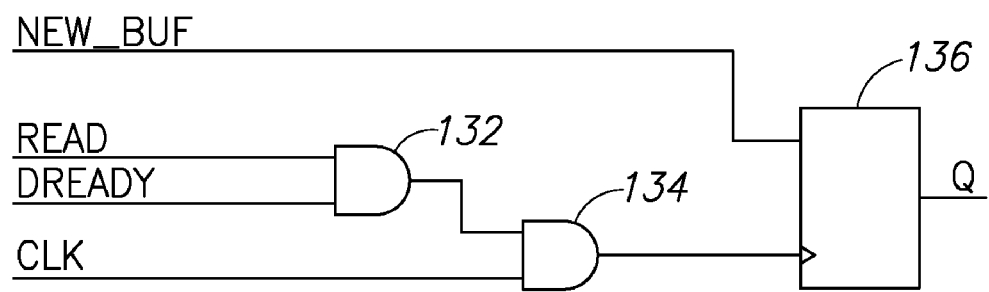
FIG. 10 is a circuit design illustrating an example of a clock gated simplified representation of the circuit of FIG. 8 with equivalent logic.

An illustrative example of simplifying the logic in a clock gated circuit can be found in FIGS. 8, 9 and 10. These figures show how unclock gating can aid in simplifying the logic of a clock gated circuit. In this example, simplification of the data input with respect to the clock gate can be done only if the function driving the output of the memory element is considered as a whole. This is accomplished by first unclock gating the memory elements.

An example of a clock gated original circuit which potentially contains extraneous logic can be found in FIG. 8. The circuit, generally referenced 110, comprises OR gate 112, multiplexer 114, AND gates 116, 118 and memory element 120. In this circuit the CLK signal is an input to AND gate 118, whose output is an input to memory element 120. The CLK is one of six signals into this circuit.

An example of an unclock gated version of the circuit of FIG. 8 is shown in FIG. 9. The circuit, generally referenced 190, comprises AND gate 192, OR gate 194, multiplexers 196, 198 and memory element 200. In this circuit, the CLK signal is input directly to memory element 200. Another input to memory element 200 is the output of multiplexer 198. The CLK is one of six signals into this circuit. Output from memory element 200 is both an input to multiplexer 198 and the resulting output signal Q of the circuit.

The logic representation of this circuit can be expressed as if (READ and DREADY) then (if (READ or FETCH) then NEW_BUF else OLD_BUF) else Q Using simplification techniques well-known in the art, the logic representation can be simplified to if (READ and DREADY) then NEW_BUF else Q A circuit implementing the simplified logic is shown in FIG. 10. The circuit, generally referenced 130, comprises AND gates 132, 134 and memory element 136. Note that that the number of logic elements has been reduced from five to three and the number of signal inputs has been reduced from six to four.

Note that the techniques described herein can be implemented for circuits containing other sequential and/or memory elements, not only latches and flip-flop memory elements. A key feature of the invention is to view the function of a memory element as a whole during logic synthesis. This technique is applicable to other circuit types as well and is not limited to the clock gating examples presented supra. For example, consider an "enable" pin on a latch having the functionality that the data input is sampled only if the enable pin has the value "1". The enable pin in this case functions in the same manner as a clock gate, and the methods described above apply to this case as well, with the difference between clock gating and an enable pin being electrical, not functional. A gated clock works by turning off the clock, whereas an enable pin is not limited to function in the same manner.

Enable pins are functionally similar to a clock gate; the difference being electrical. It is possible to apply the principles of the present invention to different types of memory elements having various types of inputs that perform diverse functions. For example, a memory element with two data inputs, A and B, and whose output is the "OR" of the two inputs. Considering the memory element function of the memory element as a whole, such memory elements can be found to be equivalent to traditional memory elements whose data input is the logic function "A|B". In addition, the combinational logic driving such memory elements can be simplified. For example, assume that input A is the function X|Y and input B is the function Y|Z. By considering the memory element as a whole, it can be derived that the input logic is equivalent to the logic function X|Y|Z. Therefore, the logic driving inputs A and B can be simplified in a number of ways. For example, if A is set to "X" then B can be set to Y|Z. Alternatively if A is set to X|Y, then B can be set to Z. Consequently, considering the function of the memory element as a whole enables logic circuit optimizations that would not otherwise be possible if the various logic elements are examined separately.

It is intended that the appended claims cover all such features and advantages of the invention that fall within the spirit and scope of the present invention. As numerous modifications and changes will readily occur to those skilled in the art, it is intended that the invention not be limited to the limited number of embodiments described herein. Accordingly, it will be appreciated that all suitable variations, modifications and equivalents may be resorted to, falling within the spirit and scope of the present invention.

What is claimed is:

1. A method of eliminating redundant logic elements in an integrated circuit, said method comprising the steps of:
    unclock gating, by a computer, each original clock gated circuit to generate an unclock gated circuit representation of each original clock gated circuit thereby enabling clock and data inputs of said original circuit to be analyzed separately;
    generating a canonical representation, by said computer, for the inputs of each unclock gated circuit representation:
    searching for duplicate canonical representations among said unclock gated circuit representations; and
    removing any found duplicate circuits.

2. The method according to claim 1, wherein said step of unclock gating a clock gated circuit comprises the steps of:
    adding a multiplexer to said circuit to be unclock gated;
    inputting the output from a memory element being unclock gated to a first data input of said multiplexer;
    inputting an input from the memory element being unclock gated to a second data input of said multiplexer;
    inputting a clock gate signal to an enable input of said multiplexer;
    coupling an output of said multiplexer into an input of said memory element; and
    removing clock gating logic circuitry to yield an unclock gated circuit thereby.

3. The method according to claim 1, wherein each said clock gated circuit comprises at least one memory element.

4. The method according to claim 1, wherein said integrated circuit comprises a plurality of clock gated circuits.

5. The method according to claim 1, wherein said step of generating a canonical representation comprises the step of generating a canonical representation for each clock gated circuit.

6. The method according to claim 1, wherein said step of removing any found duplicate circuits comprises the steps of:
    choosing a circuit to retain; and
    reconfiguring said integrated circuit such that instances of deleted clock gated circuits reference said retained circuit.

7. A method of logic simplification of a clock gated circuit having a plurality of memory elements, said method comprising the steps of:
    unclock gating, by a computer, the original clock gated circuit to yield an unclock gated circuit representation of said original clock gated circuit thereby enabling clock and data inputs of said original circuit to be analyzed separately; and
    applying logic optimization, by said computer, to said unclock gated circuit representation to generate a functionally identical circuit wherein the combinational logic has been optimized.

8. The method according to claim 7, wherein said step of unclock gating a clock gated circuit comprises the steps of:
    adding a multiplexer to said circuit to be unclock gated;
    inputting the output from a memory element being unclock gated to a first data input of said multiplexer;
    inputting an input from the memory element being unclock gated to a second data input of said multiplexer;
    inputting a clock gate signal to an enable input of said multiplexer;
    coupling an output of said multiplexer into an input of said memory element; and removing clock gating logic circuitry to yield an unclock gated circuit thereby.

9. The method according to claim 7, wherein said step of applying logic optimization comprises the use of standard logic optimization methods and techniques.

10. The method according to claim 7, further comprising the step of clock gating said functionally identical circuit.

11. The method according to claim 7, wherein said step of applying logic optimization comprises viewing the logic functions of each output of each memory element in said clock gated circuit as a whole.

12. A method for optimizing the design of an integrated circuit having at least one clock gated circuit, said method comprising the steps of:
    unclock gating, by a computer, each original clock gated circuit to yield an unclock gated circuit representation of said original clock gated circuit thereby enabling clock and data inputs of said original circuit to be analyzed separately;

generating a canonical representation, by said computer, for the inputs of each unclock gated circuit representation;

searching for duplicate canonical representations among said unclock gated circuit representations;

removing any found duplicate circuits; and applying logic optimization to said unclock gated circuit representation to yield a functionally identical circuit wherein the combinational logic has been optimized.

13. The method according to claim 12, wherein said step of unclock gating a clock gated circuit comprises the steps of:
adding a multiplexer to said circuit to be unclock gated;
inputting the output from a memory element being unclock gated to a first data input of said multiplexer;
inputting an input from the memory element being unclock gated to a second data input of said multiplexer;
inputting a clock gate signal to an enable input of said multiplexer;
coupling an output of said multiplexer into an input of said memory element; and
removing clock gating logic circuitry to yield an unclock gated circuit thereby.

14. The method according to claim 12, wherein each said clock gated circuit comprises at least one memory element.

15. The method according to claim 12, wherein said integrated circuit comprises a plurality of clock gated circuits.

16. The method according to claim 12, wherein said step of generating a canonical representation comprises the step of generating a data structure representing the function implemented by the unclock gated circuit.

17. The method according to claim 12, wherein said step of removing any found duplicate circuits comprises the steps of:
choosing a circuit to retain; and
reconfiguring said integrated circuit such that instances of deleted clock gated circuits reference said retained circuit.

18. The method according to claim 12, further comprising the step of clock gating said functionally identical circuit.

19. A method for optimizing the design of an integrated circuit having memory elements wherein clock gating has been applied to a plurality of signals and memory elements, said method comprising the steps of:
removing, by a computer, clock gating from the plurality of signals and memory elements;
performing logic optimization, by said computer, whereby the logic of said integrated circuit is simplified while retaining its original functionality; and
performing logic optimization whereby any duplicate memory elements are eliminated.

20. The method according to claim 19, wherein said step of removing comprises viewing said memory element as a whole, rather than its separate parts.

* * * * *